United States Patent
Allen-Ware et al.

(10) Patent No.: US 10,169,048 B1
(45) Date of Patent: Jan. 1, 2019

(54) PREPARING COMPUTER NODES TO BOOT IN A MULTIDIMENSIONAL TORUS FABRIC NETWORK

(71) Applicant: INTERNATIONAL BUSINESS MACHINES CORPORATION, Armonk, NY (US)

(72) Inventors: Malcolm S. Allen-Ware, Tucson, AZ (US); Jeffrey Bloom, Bellingham, MA (US); James H. H. Chou, Austin, TX (US); Marc Cochran, Shrewsbury, MA (US); Kevin A. Hughes, Cedar Park, TX (US); Alexander T. Iannicelli, Andover, MA (US); Jason G. Pearce, Round Rock, TX (US); Alan Ross, Windham, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/635,510

(22) Filed: Jun. 28, 2017

(51) Int. Cl.
    *G06F 9/4401* (2018.01)
    *H04L 29/12* (2006.01)

(52) U.S. Cl.
    CPC ........ *G06F 9/4416* (2013.01); *H04L 61/1541* (2013.01); *H04L 61/2015* (2013.01); *H04L 61/2069* (2013.01); *H04L 61/6022* (2013.01)

(58) Field of Classification Search
    CPC ........ H04L 12/24; H04L 12/66; H04L 12/721
    See application file for complete search history.

(56) References Cited

U.S. PATENT DOCUMENTS

| | | | |
|---|---|---|---|
| 6,230,252 B1 | 5/2001 | Passint et al. | |
| 6,434,620 B1 * | 8/2002 | Boucher | H04L 29/06 709/230 |

(Continued)

FOREIGN PATENT DOCUMENTS

| | | |
|---|---|---|
| CN | 103501242 A | 1/2014 |
| WO | 98017043 A2 | 4/1998 |

OTHER PUBLICATIONS

Allen-Ware, et al., "Preparing Computer Nodes to Boot in a Multidimensional Torus Fabric Network", U.S. Appl. No. 15/906,193, filed Feb. 27, 2018.

(Continued)

*Primary Examiner* — Arvin Eskandarnia
(74) *Attorney, Agent, or Firm* — Teddi E. Maranzano

(57) ABSTRACT

Preparing a plurality of computer nodes to boot in a multi-dimensional fabric network is provided. The method includes a fabric processor (FP) generating a plurality of DHCP discovery packets using a baseboard management controller (BMC) MAC address, and placing them into the multi-host switch. A dedicated connection directly connects the BMC and the FP. All ports of the multi-host switch broadcast DHCP discovery packets into the fabric network. The BMC, FP, and switch are all within the node. A designated exit node inside the fabric connects to a provisioning node not part of the fabric. The exit node relays DHCP traffic from the fabric. A location-based IP address uniquely identifies the nodes' physical location in the fabric. The IP address is calculated based on inventory records describing physical location information about the nodes. The FP calculates a host MAC address using its IP address and configures it onto the switch.

20 Claims, 11 Drawing Sheets

(56) References Cited

U.S. PATENT DOCUMENTS

| | | | |
|---|---|---|---|
| 6,765,931 B1* | 7/2004 | Rabenko | H04B 3/23 348/E7.049 |
| 7,243,142 B2 | 7/2007 | Poirot et al. | |
| 8,209,395 B2 | 6/2012 | Richoux | |
| 8,667,049 B2 | 3/2014 | Blumrich et al. | |
| 8,774,625 B2 | 7/2014 | Binkert et al. | |
| 8,797,843 B2 | 8/2014 | Kamath et al. | |
| 8,966,018 B2* | 2/2015 | Bugwadia | G06F 9/4411 709/220 |
| 9,124,959 B2 | 9/2015 | Xu et al. | |
| 9,143,338 B2 | 9/2015 | Fricker | |
| 9,325,604 B2 | 4/2016 | Li et al. | |
| 9,331,958 B2 | 5/2016 | Lie et al. | |
| 9,419,842 B1* | 8/2016 | Galliher, III | H04L 29/06 |
| 9,442,786 B2 | 9/2016 | Singh et al. | |
| 9,531,596 B2 | 12/2016 | Volpe et al. | |
| 2007/0027964 A1* | 2/2007 | Herrod | H04L 41/0806 709/220 |
| 2007/0253437 A1 | 11/2007 | Radhakrishnan et al. | |
| 2011/0307715 A1 | 12/2011 | Diab | |
| 2013/0322838 A1 | 12/2013 | Julien et al. | |
| 2014/0006815 A1 | 1/2014 | Castro-Leon et al. | |
| 2014/0149715 A1 | 5/2014 | Inman | |
| 2014/0188996 A1 | 7/2014 | Lie et al. | |
| 2015/0036681 A1 | 2/2015 | Lie et al. | |
| 2015/0055952 A1 | 2/2015 | Younce et al. | |
| 2015/0098700 A1 | 4/2015 | Zhu et al. | |
| 2015/0222533 A1* | 8/2015 | Birrittella | H04L 45/66 370/392 |
| 2015/0237421 A1 | 8/2015 | Morgan et al. | |
| 2015/0333957 A1 | 11/2015 | James et al. | |
| 2016/0070282 A1 | 3/2016 | Chapel et al. | |
| 2016/0077570 A1 | 3/2016 | Varadarajan et al. | |
| 2016/0210261 A1 | 7/2016 | Oprea | |
| 2016/0323037 A1 | 11/2016 | Leigh et al. | |
| 2016/0335209 A1 | 11/2016 | Jau et al. | |
| 2016/0380895 A1 | 12/2016 | Xiong et al. | |
| 2017/0054524 A1 | 2/2017 | Gumaste et al. | |
| 2018/0041470 A1* | 2/2018 | Schultz | H04L 63/029 |

OTHER PUBLICATIONS

List of IBM Patents and Patent Applications Treated as Related. Filed Feb. 27, 2018. 2 pages.

Mell et al., "The NIST Definition of Cloud Computing," U.S. Department of Commerce, National Institute of Standards and Technology, Special Publication 800-145, Gaithersburg, MD, Sep. 2011, pp. 1-7.

Ajima et al., "Tofu: A 6D Mesh/Torus Interconnect for Exascale Computers," Computer, IEEE Computer Society, vol. 42, Issue 11, 2009, pp. 36-40.

Cray, "Cray Xt3 Datasheet," Cray XT3™ Supercomputer Scalable by Design, © 2005 Cray, Inc., 6 pgs.

Punhani, et al., "A Modified Diagonal Mesh Interconnection Network," 2014 Annual IEEE India Conference (INDICON), © 2014 IEEE, pp. 1-6.

Tang et al., "Diagonal and Toroidal Mesh Networks," IEEE Transactions on Computers, vol. 43, No. 7, Jul. 1994, pp. 815-826.

Leroux et al., "New Developments on Tore Supra Data Acquisition Units", WEPMN020, Proceedings of ICALEPCS2011, Grenoble, France, Copyright © 2011, pp. 922-925.

Dockès et al., "30.8. Diskless Operation with PXE Chapter 30. Advanced Networking", https://www.freebsd.org/doc/handbook/network-diskless.html, C. (2017), pp. 1-7.

* cited by examiner

US 10,169,048 B1

PREPARING COMPUTER NODES TO BOOT IN A MULTIDIMENSIONAL TORUS FABRIC NETWORK

BACKGROUND

The present disclosure relates generally to the field of cloud computing, and more particularly to preparing computer nodes to boot in a multidimensional torus fabric network.

The cloud computing model provides sharing of computer processing resources among users in an enterprise, or even among several unrelated enterprises, all residing within the same cloud infrastructure. As cloud infrastructures grow in complexity, managing the physical resources and maintaining high levels of performance and reliability become increasingly challenging.

SUMMARY

Embodiments of the present invention disclose a method and system for preparing a plurality of computer nodes to boot in a multidimensional fabric network is provided. The method includes a fabric processor (FP) generating a plurality of DHCP discovery packets using a MAC address that the FP retrieves from a baseboard management controller (BMC). The FP places the generated DHCP discovery packets into the multi-host switch. The BMC is directly connected to the FP by a dedicated Ethernet connection of at least one Gbps between the two. The multi-host switch broadcasts the DHCP discovery packets into the torus over each of its six ports. The BMC, FP, and switch are all within the computer node. A computer node inside the fabric is designated the exit node and connects to a provisioning node that is not part of the fabric. The exit node is the relay for DHCP traffic from the fabric. The nodes receive a location-based IP address uniquely identifying their physical location in the fabric. The IP address is calculated based on inventory records describing physical location information about the nodes. The FP uses its IP address to calculate a host MAC address. The FP configures the host MAC address onto the switch.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
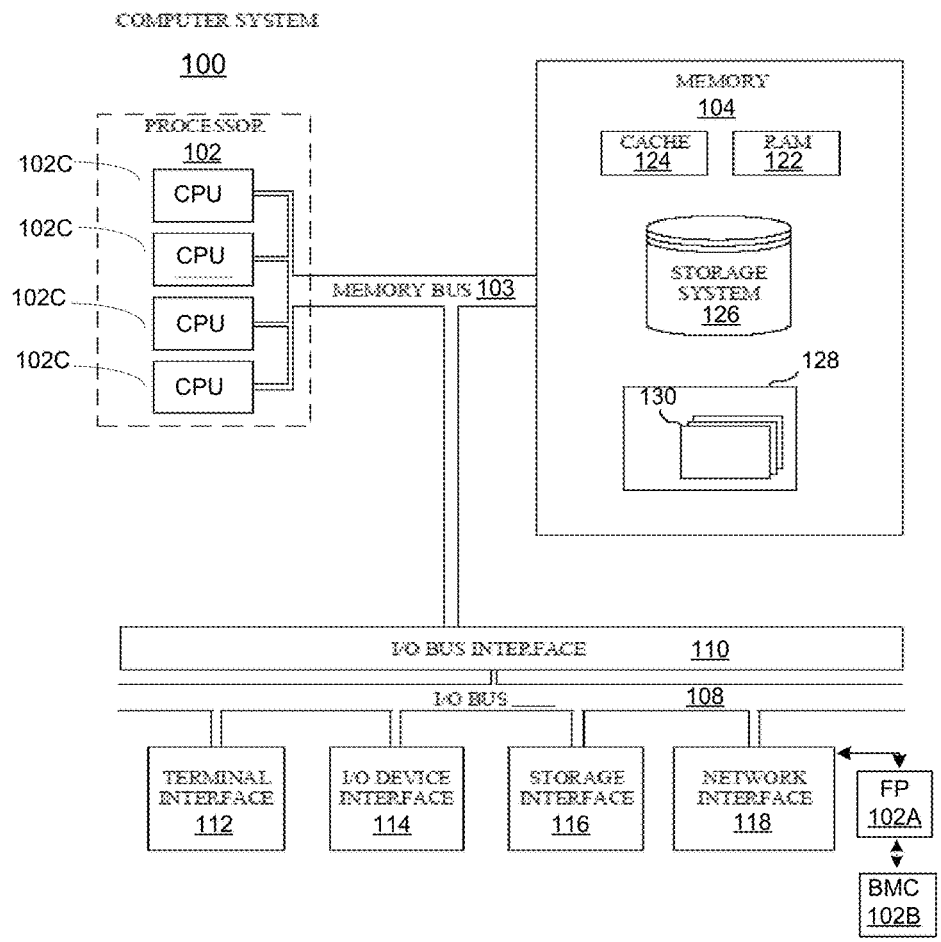
FIG. 1 illustrates a high-level block diagram of an example computer system that may be used in implementing one or more of the methods, tools, and modules, and any related functions, described herein, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computing, and in particular to preparing computer nodes to boot in a multidimensional torus fabric network. A torus fabric is a distributed switch network topology for connecting processing nodes in a parallel computer system, such as a cloud infrastructure. A torus fabric may include 1D, and higher dimensional topologies. Hereinafter, for the purposes of describing embodiments of the present disclosure, torus refers to 3D fabric topology.

While the present disclosure is not necessarily limited to such applications, various aspects of the disclosure may be appreciated through a discussion of various examples using this context.

Management and performance challenges tend to increase in data centers running advanced distributed computing systems, such as Infrastructure as a Service, as the complexity of the infrastructures increase. Such challenges include network bandwidth and latencies among servers, storage nodes, and top-of-rack (ToR) and management switches. In particular, failures in ToR or management switches may cause communications failures that isolate the groups of servers and/or storage nodes to which the switches are connected. A typical cloud rack can have both a ToR and a management switch. However, embodiments of the present disclosure eliminate having the ToR and the management switch in the server rack.

Additionally, racks that are densely populated with computing equipment typically have limited space for cable attachment. For example, in a cloud computing system configured in a 3D torus network topology, each server may require six different cables (e.g., one for each of the positive and negative X, Y, and Z directions) to link the servers together, plus a management network connection to a ToR management switch in the rack. Accordingly, a rack having forty eight servers would require 144 cables (e.g., 48*6 divided by 2 because each pair of servers share a cable) to provide the 3D torus mesh. Adding cables for the management network, increases the total number of network cables for the rack to 192 cables.

Such cable density tends to introduce both installation and maintenance issues that may result in compromising the reliability and availability of the cloud computing system. For example, the process of connecting the high number of cables in the limited space may be both time consuming and prone to errors due to incorrect cable routing or poor cable seating. Additionally, the high cable density may impede air flow, which may increase power consumption for running and cooling the computing equipment. Furthermore, bending or crimping the fiber cable must be carefully avoided, since such damage may break the glass fiber and impair the signal. Each server/node in the rack includes a management network cable that connects the server/node to the ToR management switch. Management packets, for example commands to power up or to move workloads between servers, are transmitted using the single connection to the management switch. Accordingly, this connection represents a single point of failure. While redundant management connections may address this problem, the additional cables may further exacerbate the problems described above with regard to cable density in the racks.

Embodiments of the present disclosure include a rack-resident cable box (box) communicatively coupled to high speed multi-host controllers (e.g., "600" gigabit per second (Gbps)) embedded in each server and storage node in the torus. The rack-resident cable box may be communicatively coupled to the embedded multi-host controllers using any suitable connection technology (e.g., optical cabling). The rack-resident cable box may include a set of optical connector adapters, such as multi-fiber push on (MPO) type connector adapters, and a set of optical pigtails. The optical pigtails may be directly connected or fused on one end to the MPO ports within the rack-resident cable box. The optical pigtails may protrude from each box and have MPO connectors for connecting to the servers and storage nodes. Internal cabling within the rack-resident cable box (e.g., optical fiber cabling) may interconnect the MPO ports to the pigtails. The internal cabling may route communications, such as data packets and management packets in such a way as to create a 3D torus fabric.

Embodiments of the present disclosure may address one or more of the performance, management, and reliability issues discussed above by including the management network in the torus by having both the management packets and the data packets flow along the same physical cabling. Each node may include a fabric processor with a local connection to a management entity inside the torus. In this way, management traffic may flow on the torus with other traffic, but may be separated out at the target node by the fabric processor.

Integrating management packets with data packets in the torus may tend towards mitigating several performance, management and reliability issues. With fewer cables in each rack, both installation time and cabling errors may be reduced, while airflow around the servers may increase. Additionally, the torus topology itself, may create redundancy in the management path, while eliminating the ToR management switches typical in current practice. Further, being integrated in the torus, management actions may flow at native speeds of the torus rather than at the limited (i.e., "1" Gbps) speed of traditional management networks. As a result, customer bare metal images may be rapidly deployed onto the servers and/or virtual machines, and the cloud infrastructure may rapidly initialize.

It is to be understood that the aforementioned advantages are exemplary and should not be construed as limiting. Embodiments of the present disclosure can contain all, some, or none of the aforementioned advantages while remaining within the spirit and scope of the present disclosure.

Turning now to the figures, FIG. 1 is a high-level block diagram of an example computer system 100 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 100 may comprise one or more CPUs 102, a memory subsystem 104, a terminal interface 112, a storage interface 116, an I/O (Input/Output) device interface 114, and a network interface 118, all of which may be communicatively coupled, directly or indirectly, for inter-component communication via a memory bus 103, an I/O bus 108, and an I/O bus interface unit 110.

Figure 2:
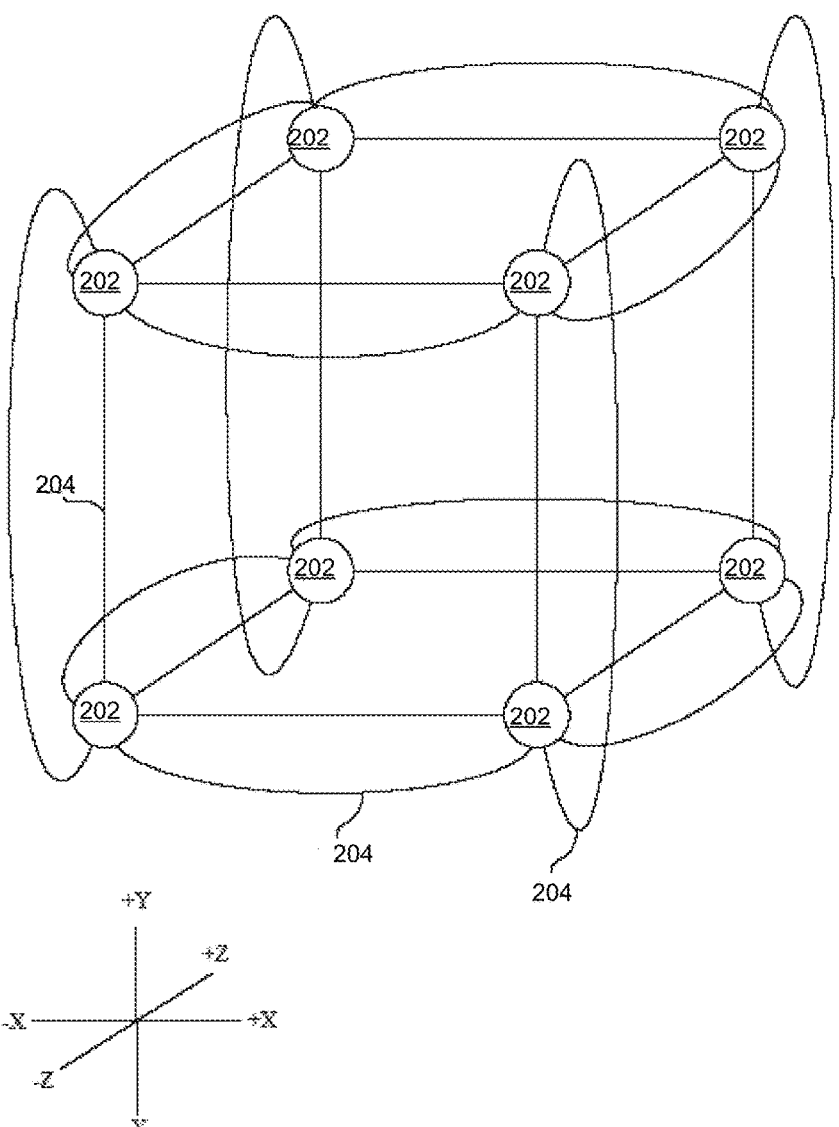
FIG. 2 illustrates an exemplary network topology for a distributed computing system, in accordance with embodiments of the present disclosure.
Figure 10:
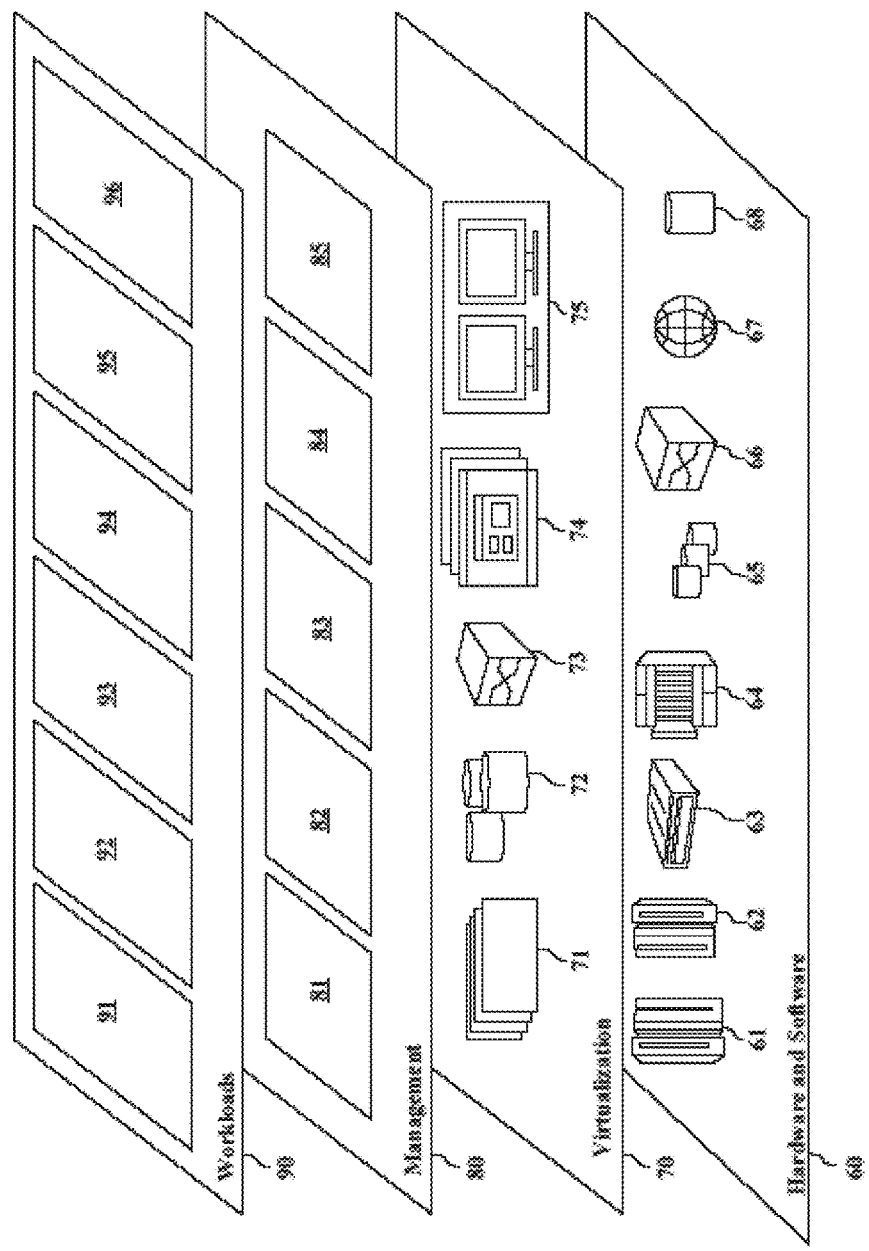
FIG. 10 depicts abstraction model layers, in accordance with embodiments of the present disclosure.

The network interface 118 may include a multi-host switch configured to interconnect a plurality of computing or storage nodes (e.g., nodes 202 of FIG. 1 or hardware and software layer 60 of FIG. 10) together in a network fabric, such as the 3D torus fabric of FIG. 2. The network interface 118 can be configured to selectively forward network traffic containing data and management packets to other network interfaces 118 in other nodes. The torus fabric is a distributed switch network topology for connecting processing nodes. Therefore, the network interface 118 within each node is a full switch. In some embodiments, the network interface 118 is an Intel Ethernet Controller FM100000 Series product, but embodiments are not so limited. Any switch providing the capabilities of the FM100000 Series product can be used. The network interface 118 can include a plurality of Ethernet ports and/or a plurality of Peripheral Component Interconnect Express (PCIx) ports. In some embodiments, the network interface 118 is an Ethernet-based switch. In some embodiments, the network interface 118 is a single-host controller.

Each individual server, i.e., node, in the computer system 100 may contain a combination of special purpose and general-purpose programmable central processing units. The fabric processor (FP) 102A is a special purpose processor within the node that connects the node to the BMC 102B. The BMC 102B typically may be within the node, but may reside outside the node elsewhere in the torus fabric. The FP 102A and the BMC 102B cooperate to identify and separate out data traffic and management traffic flowing on the torus that is destined for the node. Each FP 102A discovers the connectivity of its node in relation to other adjacent nodes in the torus. The torus fabric topology is built and mapped through this cascading discovery process.

The baseboard management controller (BMC) 102B is a special purpose service processor within the node. The BMC 102B responds to management commands regarding the physical state of the node, such as commands to power the node on. The BMC 102B is connected to the FP 102A by a dedicated management port. Upon power up, the FP 102A contacts the BMC 102B and retrieves its MAC address. The MAC address is used to retrieve relevant inventory information that indicates the node's physical location in the datacenter.

CPUs 102C, also referred to as host processors, are general-purpose in that they are available for allocation to virtual machines, application workloads, and similar end-user purposes. As shown, the CPUs 102C communicate with other components of the computer system 100 over the memory bus 103. In contrast, the FP 102A and the BMC 102B communicate using a dedicated Ethernet connection of at least one Gbps. Isolating network traffic in this way prevents direct access from the CPUs 102C to either the FP 102A or BMC 102B. In a cloud computing infrastructure that includes bare metal tenants (i.e., customers who are not restricted in what software they load on a host), ensuring that the CPUs 102C cannot access the management network of the FP 102A and BMC 102B is additional security for each of the tenants and for the infrastructure as a whole.

System memory 104 may include computer system readable media in the form of volatile memory, such as random access memory (RAM) 122 or cache memory 124. Computer system 100 may further include other removable/non-removable, volatile/non-volatile computer system storage media. By way of example only, storage system 126 can be provided for reading from and writing to a non-removable, non-volatile magnetic media, such as solid state storage (SSD), or a "hard drive." In embodiments, SSD storage is the primary medium, particularly in nodes that are provisioned as storage nodes. Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 104 can include flash memory, e.g., a flash memory stick drive or a flash drive. Memory devices can be connected to memory bus 103 by one or more data media interfaces. The memory 104 may include at least one program product having a set (e.g., at least one) of program modules that are configured to carry out the functions of various embodiments.

One or more programs/utilities 128, each having at least one set of program modules 130 may be stored in memory 104. The programs/utilities 128 may include a hypervisor (also referred to as a virtual machine monitor), one or more operating systems, one or more application programs, other program modules, and program data.

Although the memory bus 103 is shown in FIG. 1 as a single bus structure providing a direct communication path among the processors 102, the memory subsystem 104, and the I/O bus interface 110, the memory bus 103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 110 and the I/O bus 108 are shown as single respective units, the computer system 100 may, in some embodiments, contain multiple I/O bus interface units 110, multiple I/O buses 108, or both. Further, while multiple I/O interface units are shown, which separate the I/O bus 108 from various communications paths running to the various I/O devices, in other embodiments some or all of the I/O devices may be connected directly to one or more system I/O buses.

In some embodiments, the computer system 100 may be a multi-user mainframe computer system, a single-user system, or a server computer or similar device that has little or no direct user interface, but receives requests from other computer systems (clients).

It is noted that FIG. 1 is intended to depict the representative major components of an exemplary computer system 100. In some embodiments, however, individual components may have greater or lesser complexity than as represented in FIG. 1, components other than or in addition to those shown in FIG. 1 may be present, and the number, type, and configuration of such components may vary.

FIG. 2 illustrates an exemplary network topology 200 (e.g., a 3D torus fabric) for a distributed computing system, in accordance with embodiments of the present disclosure. In the example shown in FIG. 2, each circle represents a cabled node 202. The nodes 202 may include, but are not limited to, server computers, storage systems, management identities, other computer systems, or any combination thereof. The lines connecting nodes 202 represent cables 204 between the cabled nodes 202. The cables 204 may be optical fiber cables, but in other embodiments, cables 204 may be other than fiber.

In some embodiments, cables 204 comprise Ethernet connections. In embodiments where cables 204 comprise Ethernet connections, individual Ethernet connections can be rated for "100" Gbps performance. As can be seen in FIG. 2, each node is connected to six adjacent nodes by cables 204, forming the 3D torus topology. Thus, in embodiments utilizing "100" Gbps Ethernet connections in a torus structure, the network topology 200 can be rated for "600" Gbps internode connectivity.

The nodes in the torus may comprise one or more types of resource nodes alone or in combination, such as compute nodes, storage nodes, and networking nodes. The resource nodes may include products from different vendors, and may include different generations of products.

In some embodiments, cables 204 can be configured to accommodate alternative connections such as, but not limited to, Fibre Channel connections, Asynchronous Transfer Mode connections, and/or InfiniBand connections. InfiniBand™/SM is a trademark and service mark of the InfiniBand Trade Association.

Although network topology 200 is shown in as a torus structure, the fabric can likewise be configured in numerous alternative arrangements such as, but not limited to, a diagonal mesh (e.g., a three-dimensional diagonal mesh) or a multi-link mesh (MLM).

As can be seen in FIG. 2, each cable 204 corresponds to one of the positive X, Y, and Z directions, and the negative X, Y, and Z directions. Outer-most cabled nodes 202, such as nodes edges of the torus 200, will have one or more wrap-around cables 204 that connect the node to nodes on the opposite side of the torus 200. For example, a node 202 that sits at the end of the torus 200 in the +X direction will have a wrap-around cable 204 that connects it to a node that sits at the end of the torus 200 in the −X direction. Likewise, corner nodes 202 will have three wrap-around cables 204, one for each of the X, Y, and Z directions.

For ease in presenting the various embodiments of the invention, eight nodes 202 are shown. However, it may be understood that any number of nodes in an arrangement otherwise consistent with this disclosure is contemplated. In some embodiments, the 3D torus fabric 200 may include more nodes, such as at least 16,000 nodes, and the nodes may be arranged with unbalanced directionality. In other words, the nodes may be connected in the 3D torus fabric 200 in other than a cubic arrangement, such as in a 22×24× 10 fabric.

While FIG. 2 shows a 3D torus fabric 200 having a plurality of nodes 202 directly connected to each other, it will be understood by a person of ordinary skill in the art, that the nodes 202 may be directly connected to one or more rack-resident cable boxes that are directly connected to the nodes 202 to form the 3D torus fabric 202 of FIG. 2.

Figure 3:
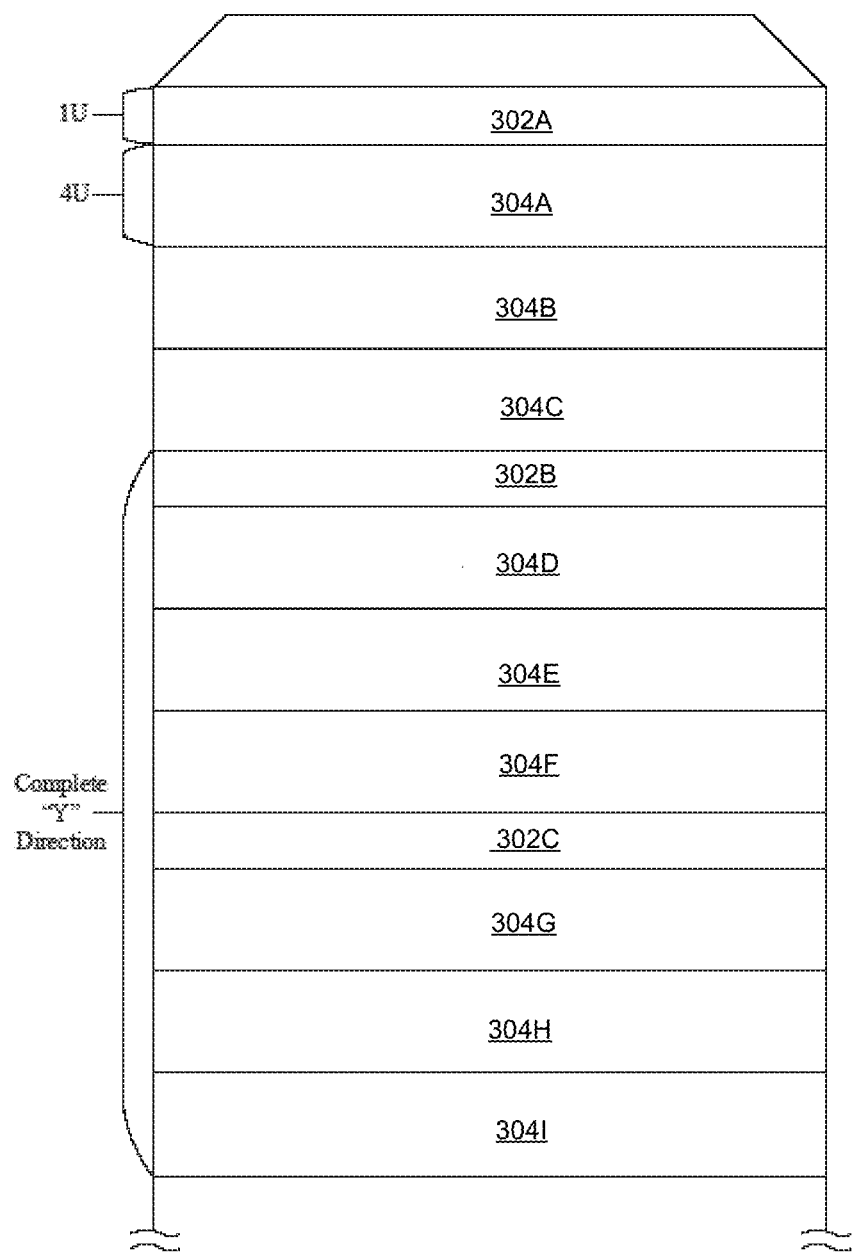
FIG. 3 illustrates a conceptual view of an example rack enclosure having a plurality of rack-resident cable boxes and chassis, in accordance with embodiments of the present disclosure.

FIG. 3 illustrates a conceptual view of an example rack enclosure 300 having a plurality of rack-resident cable boxes 302A-C and chassis 304A-I, in accordance with embodiments of the present disclosure. Each rack-resident cable box 302A-C is communicatively coupled to a set of nodes 202 (FIG. 2), which are organized into three chassis. For example, the first rack-resident cable box 302A is communicatively coupled to nodes 202 in the first three chassis 304A-C. The internal cabling is described but not shown. Likewise, the second rack-resident cable box 302B is communicatively coupled to nodes 202 in the next three chassis 304D-F, and the third rack-resident cable box 302C is communicatively coupled to nodes 202 in the last three chassis 304G-I. A 1 U box 302A and chassis having a height of 4 U are shown. A rack unit, commonly referred to as "U", is an industry standard measurement of height that is typically used in computing equipment racks. Equipment having any combination of rack units may be installed. As shown in FIG. 3, a complete "Y" dimension (both + and −) comprises the set of two rack-resident cable boxes 302B-C and six chassis.

Figures 4A, 4B:
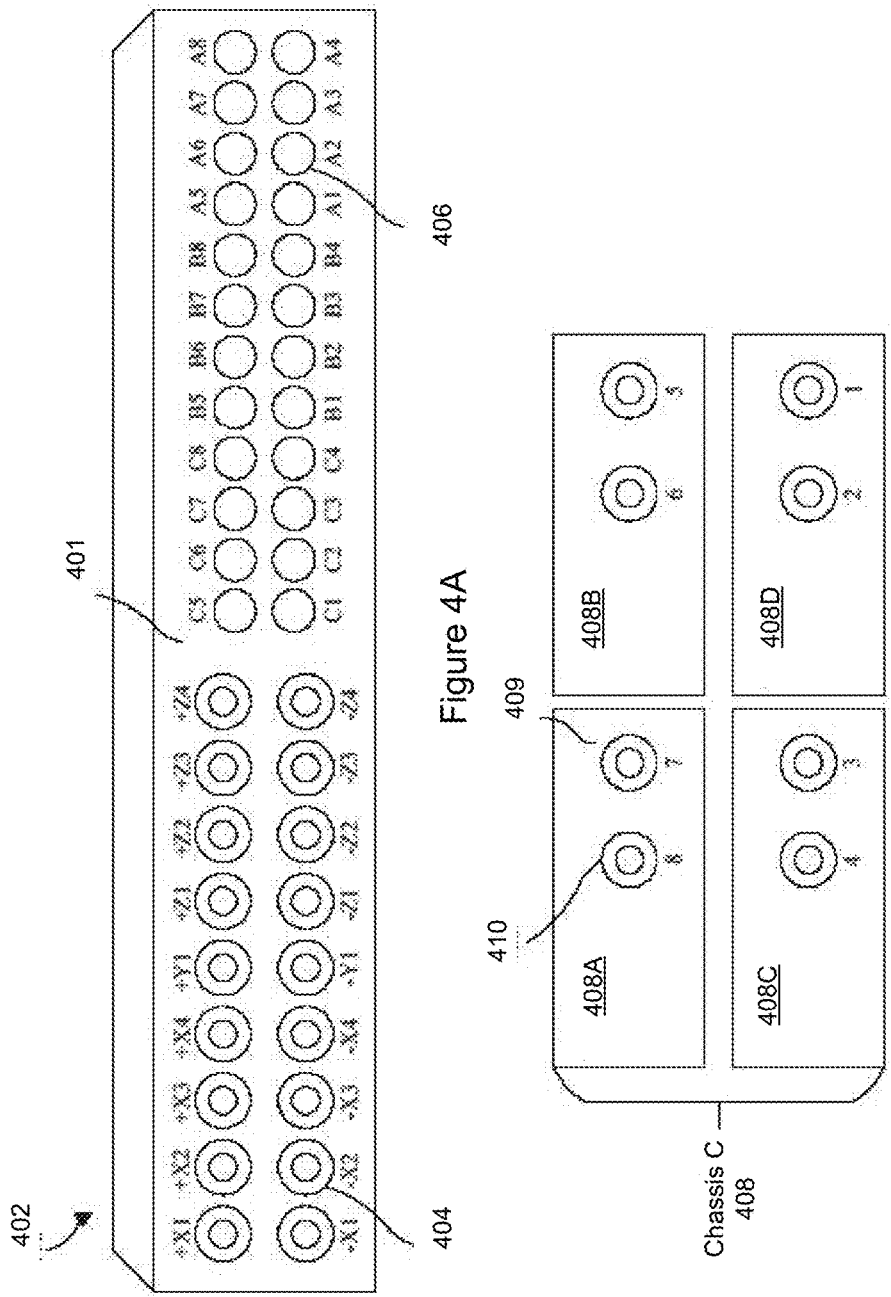
FIG. 4A illustrates a rear view of an example rack-resident cable box, in accordance with embodiments of the present disclosure.
FIG. 4B illustrates a rear view of an example chassis having four half-width servers, in accordance with embodiments of the present disclosure.
Figure 5A:
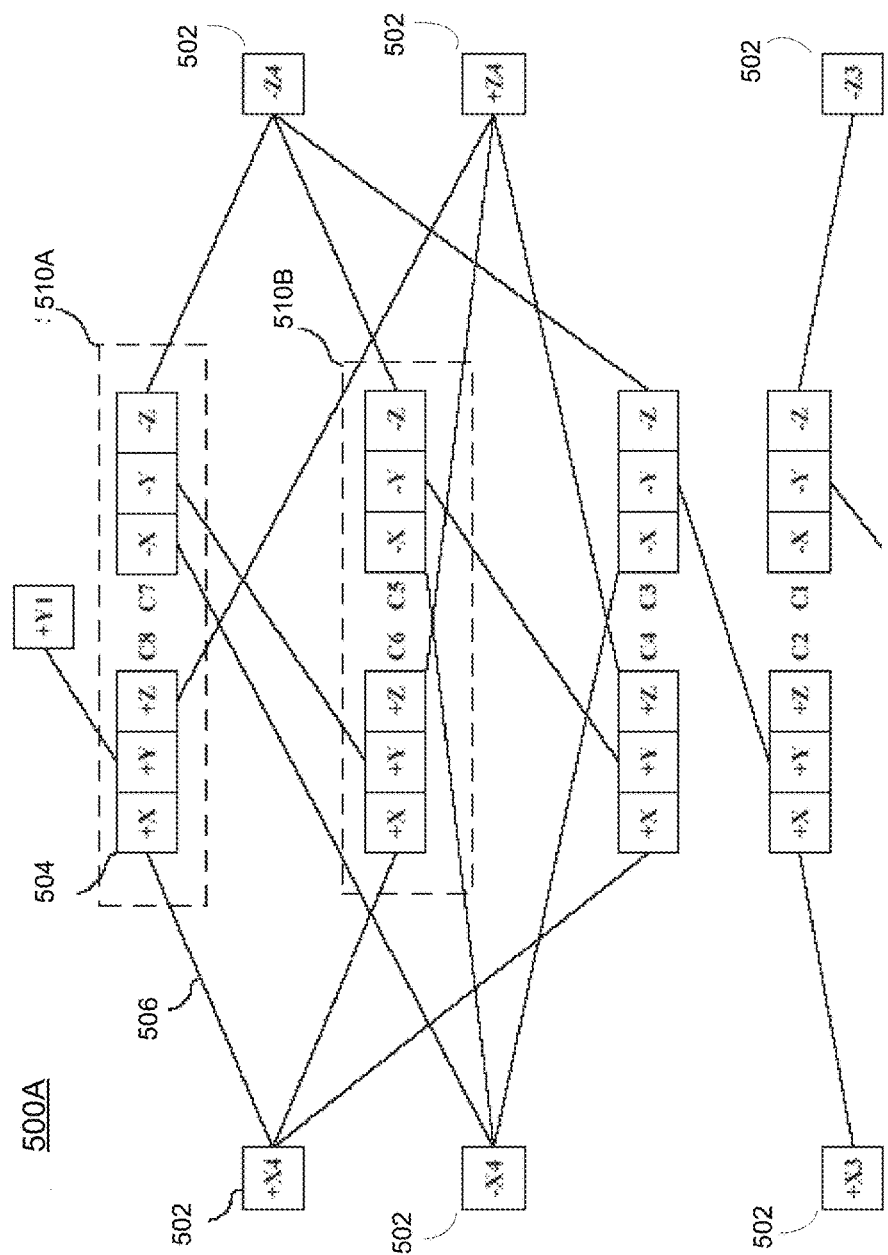
FIG. 5A illustrates a first portion of an internal wiring schematic of a rack-resident cable box, in accordance with embodiments of the present disclosure.
Figure 5B:
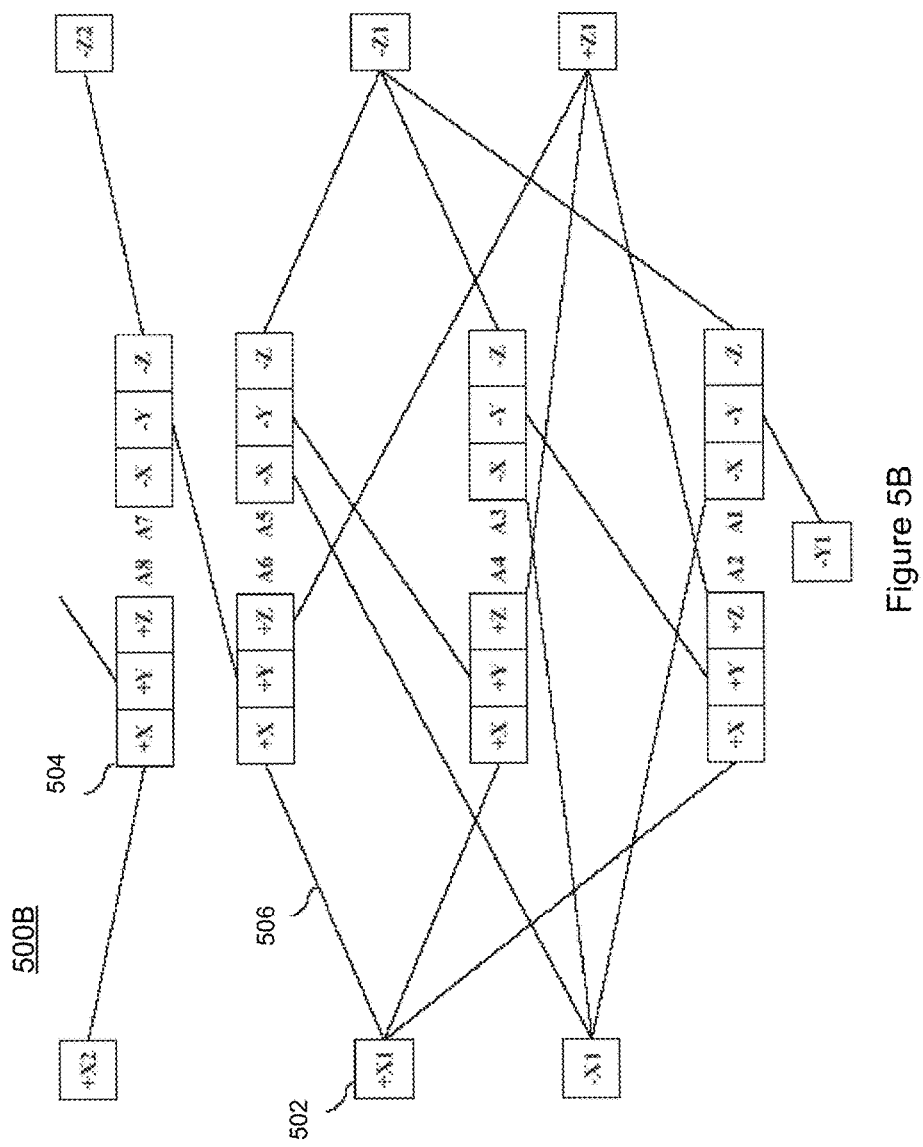
FIG. 5B illustrates a second portion of an internal wiring schematic of a rack-resident cable box, in accordance with embodiments of the present disclosure.

FIG. 4A illustrates a rear view of an example rack-resident cable box 402, such as box 302A of FIG. 3. The rack-resident cable box 402 may include a set of optical ports 404 on a back panel 401 that receive optical fiber cables. The rack-resident cable box 402 also includes a set of optical pigtails 406 that may directly connect to the internal wiring of the rack-resident cable box 402. The rack-resident cable box 402 may connect to other rack-resident cable boxes within the 3D torus fabric 200 (FIG. 2) by connecting optical cables to the optical ports 404. A dimension along the torus is configured, based on how the optical cables are connected between boxes 402. For example, the rack-resident cable box 402 may connect to another rack-resident cable box 402 in the −X direction using the optical ports 404 labeled −X1, −X2, −X3, and −X4. Internal wiring within the rack-resident cable box 402 (as shown in FIGS. 5A and 5B) directs vertical inter-node traffic. Therefore, only two optical ports 404 are required to direct vertical traffic along the Y dimension.

The rack-resident cable box 402 may connect to a set of nodes 202 (FIG. 2) using the set of optical pigtails 406. These are typically high speed, such as "300" Gbps MPO cables. For redundancy, each node 202 may connect to the rack-resident cable box 402 using two or more pigtails 406.

FIG. 4B illustrates an exemplary chassis 408 having a sled that contains four half-width physical nodes 408A-D. Each sled may connect to the rack-resident cable box 402 using a pair of twenty-four fiber MPO cables to provide redundancy. For example, one MPO cable may cover the +X, +Y, +Z path for the torus, and the other may cover the −X, −Y, −Z path. Furthermore, because the management network is integrated into the torus, the management network has full redundancy.

For illustrative purposes, the optical pigtails 406 shown in FIG. 4A are labeled according to the chassis (e.g., chassis A, chassis B, and chassis C) and connector number (e.g., 1 thru 8). The connector number in FIG. 4A corresponds to the number shown in FIG. 4B for the physical nodes. For example, the third chassis 408 (chassis C) is shown in FIG. 4B. The third chassis 408 includes four physical nodes 408A-D, each having two ports 410 on a back panel 409 of the physical node. Each port 410 corresponds to a pigtail in the rack-resident cable box 402. For example, the C5 optical pigtail shown in FIG. 4A connects to connector 5 in the third chassis 408, which is associated with the second physical node 408B.

FIG. 5A illustrates a first portion 500A of an internal wiring schematic of a rack-resident cable box 402, such as the rack-resident cable box 402 shown in FIG. 4A. Specifically, FIG. 5A illustrates most of the connections to the physical nodes in the third chassis shown in FIGS. 4A and 4B. The wiring schematic shows a set of optical ports 502 (e.g., +X4, −X4, +X3, −Z4, +Z4, and −Z3). The set of optical ports 502 may be the same as, or substantially similar to, the set of optical ports 404 described in reference to FIG. 4A. The wiring schematic further shows a set of optical pigtail directions 504 associated with the set of optical pigtails C1-C8. The set of optical pigtails C1-C8 may be the same as, or substantially similar to, the set of optical pigtails 406 described in reference to FIG. 4A. Each pair of optical pigtails (e.g., C8 and C7, C6 and C5, C4 and C3, and C2 and C1) may be connected to a single physical node.

Each optical port 502 in FIG. 5A is connected to three optical pigtails using a cable (e.g., 4 fiber pairs) 506 associated with an optical pigtail, with the exception of the +Y1 port which is used to provide wrap-around cabling along the Y direction. In some embodiments, each optical pigtail has twelve fiber pairs, and those fiber pairs are connected as three separate groups of four fiber pairs 506 for +X, +Y, +Z or −X, −Y, −Z. For example, the +X4 port 502 is connected to the +X portion of the C8, C6, and C4 pigtails. Likewise, the −Z4 port is connected to the −Z portion of the C7, C5, and C3 optical ports. While the +X3 and −Z3 ports are shown as only connecting to a single optical pigtail, namely the C2 and C1 pigtails, respectively. The +X3 and −Z3 ports may be connected to additional optical pigtails that are not shown in FIG. 5A.

Additionally, each node connected to the rack-resident cable box 402 (FIG. 4A) is connected to at least one other node that is directly connected to the rack-resident cable box 402. For example, the first node 510A, which corresponds to the C8 and C7 optical pigtails, is connected to the second node 510B, which corresponds to the C6 and C5 optical pigtails. Specifically, the C6 optical pigtail of the second node 510B is connected to the C7 optical pigtail of the first node 510A. The C1 optical pigtail is coupled with an optical pigtail of another node that is not shown in FIG. 5A.

FIG. 5B illustrates a second portion 500B of an internal wiring schematic of a rack-resident cable box, in accordance with embodiments of the present disclosure. Specifically, FIG. 5B illustrates most of the connections to the first chassis physical nodes from FIG. 4A. The wiring schematic shows a set of optical ports 502 (e.g., +X2, −X1, +X1, −Z2, +Z1, and −Z1). The set of optical ports 502 may be the same as, or substantially similar to, the set of optical ports 404 described in reference to FIG. 4A. The wiring schematic further shows a set of optical pigtail directions 504 associated with the set of optical pigtails A1-A8. The set of optical pigtails A1-A8 may be the same as, or substantially similar to, the set of optical pigtails 406 described in reference to FIG. 4A. Each pair of optical pigtails (e.g., A8 and A7, A6 and A5, A4 and A3, and A2 and A1) may be connected to a single physical node.

Each optical port 502 in FIG. 5B is connected to three optical pigtails using a cable 506, with the exception of the −Y1 port which is used to provide wrap-around cabling along the Y direction. For example, the +X1 optical port 502 is connected to the +X portion of the A2, A4, and A6 optical pigtails. Likewise, the −Z1 optical port is connected to the −Z portion of the A1, A3, and A5 optical ports. While the +X2 and −Z2 optical ports are shown as only connecting to a single optical pigtail, namely the A8 and A7 pigtails, respectively, the +X2 and −Z2 optical ports may be connected to additional optical pigtails that are not shown in FIG. 5B. As in FIG. 5A, the cables 506 may be bundles of optical fibers. Additionally, each node connected to the rack-resident cable box 402 is connected to at least one other node that is directly connected to the same rack-resident cable box 402, as described in reference to FIG. 5A.

It is to be understood that the wiring schematic portions 500A and 500B are example wiring schematics. In some embodiments, the number and arrangement of optical ports and optical pigtails may be different. For example, as described herein, the number of optical ports may be based on the rated speed of the optical ports, the desired speed of the network, etc. Likewise, the number of optical pigtails may be based on the number of optical pigtails per node, and the number of nodes per rack-resident cable box.

Figure 6:
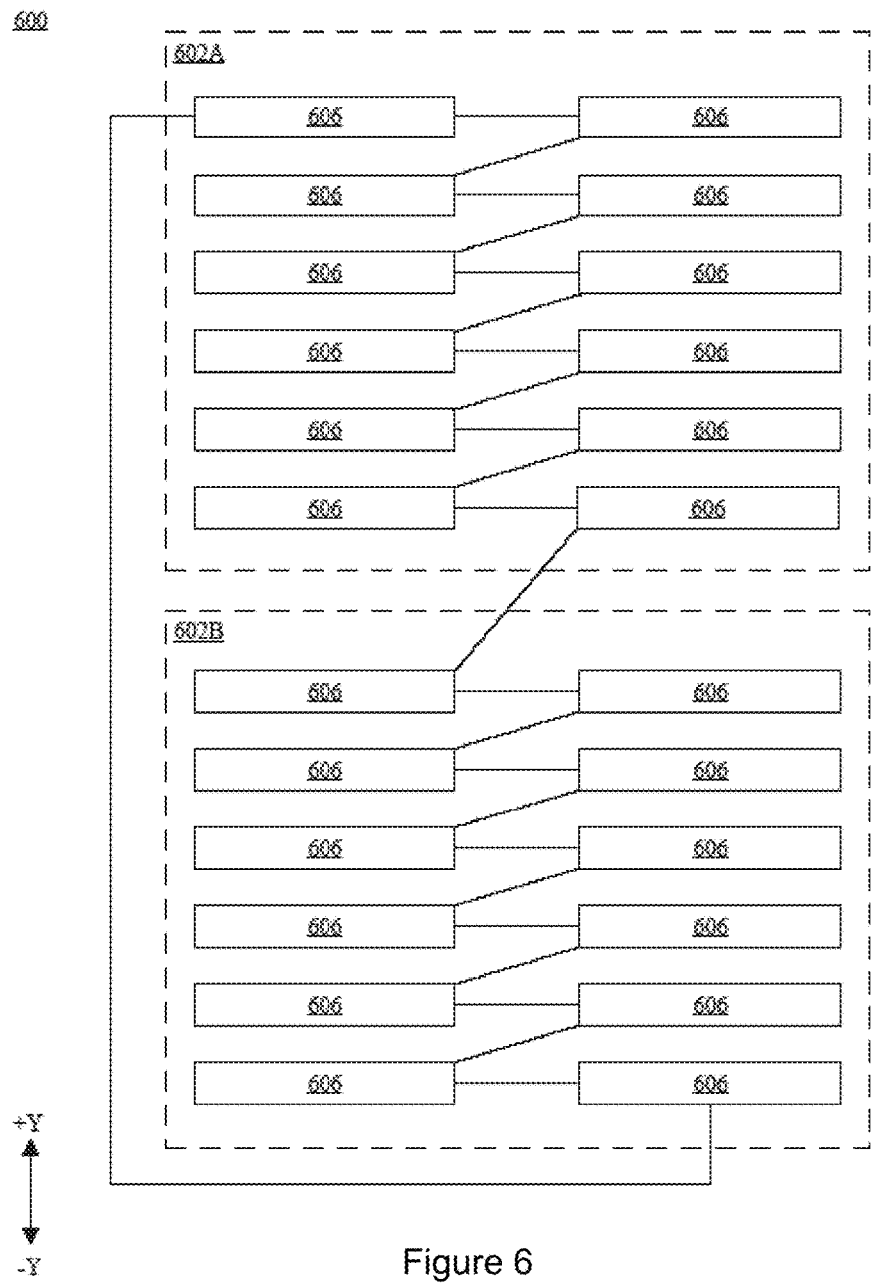
FIG. 6 illustrates an effective wiring diagram of single direction of an example 3D torus fabric having 24 servers, in accordance with embodiments of the present disclosure.

FIG. 6 illustrates an effective wiring diagram 600 of a Y direction of an example 3D torus fabric having twenty four nodes in the Y direction. Specifically, the effective wiring diagram 300 shows how the nodes are logically connected in the Y direction through the use of two rack-resident cable boxes 602A and 602B.

Each rack-resident cable box 602A and 602B are communicatively coupled with optical pigtails to twelve nodes 606. Likewise, the rack-resident cable boxes 602A and 602B are communicatively coupled to each other using two MPO cables, as described herein in reference to FIG. 4A. Each node 606 is communicatively coupled to two additional nodes along the Y direction, one in the +Y direction and one in the −Y direction. As can be seen in FIG. 6, nodes at both ends of the Y direction are connected to each other with a wrap-around cable.

Figure 7:
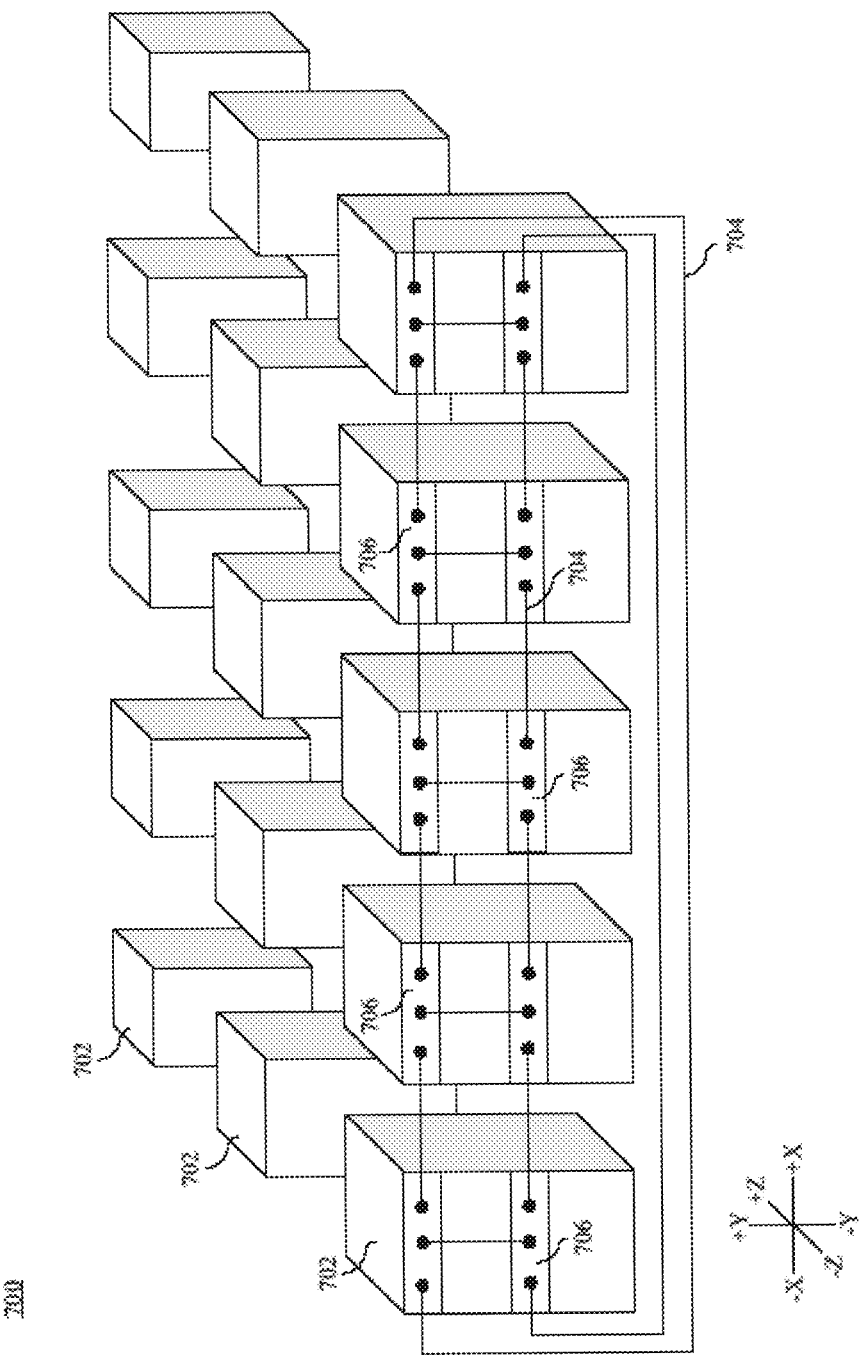
FIG. 7 illustrates an example arrangement of server racks implementing a 3D torus fabric using a rack-resident cable box within a data center, in accordance with embodiments of the present disclosure.

FIG. 7 illustrated is an example data center arrangement 700 of server racks 702 implementing a 3D torus fabric using rack-resident cable boxes 706. The server racks 702 within a single row comprise the X dimension of the 3D torus fabric. Likewise, the servers within each rack 702 comprise the Y dimension of the 3D torus fabric, and the number of rows comprise the Z dimension of the 3D torus fabric.

Each rack 702 contains a pair of rack-resident cable boxes 706. Each rack-resident cable box 706 is connected to one or more other rack-resident cable boxes 706 within the same rack 702, as well as to one or more rack-resident cable boxes 706 in neighboring racks 702 using optical cables 704. For clarity, only the X and Y-direction cabling of the first row of racks 702 is shown. However, each rack-resident cable box 706 may also be connected to rack-resident cable boxes 706 in the Z dimension. Additionally, each rack 702 may include a wrap-around cable (not shown) that connects the top rack-resident cable box 706 in the rack 702 to the bottom rack-resident cable box 706 in the rack 702.

Figure 8:
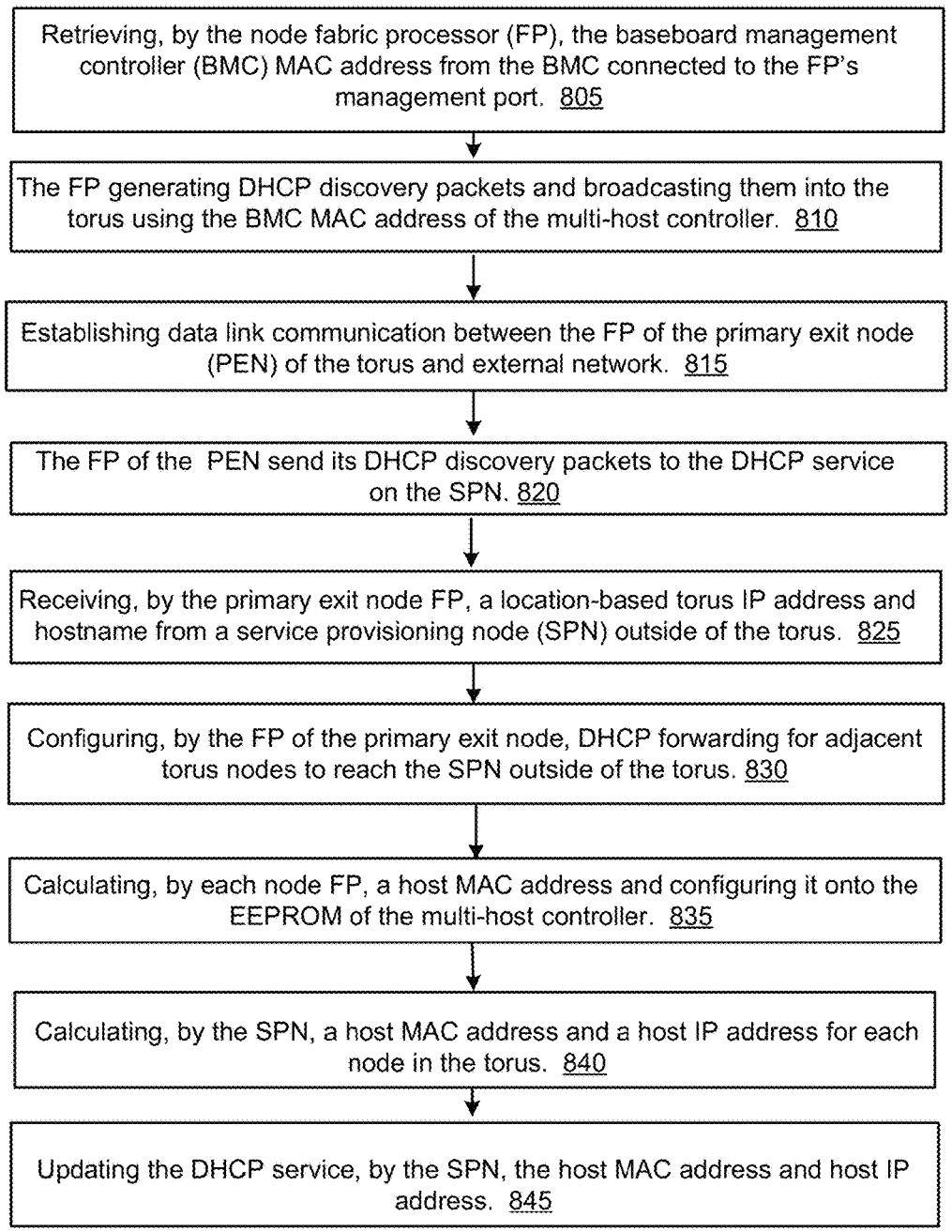
FIG. 8 depicts an exemplary embodiment of preparing computer nodes to boot in a multidimensional network fabric, in accordance with embodiments of the present disclosure.
Figure 9:
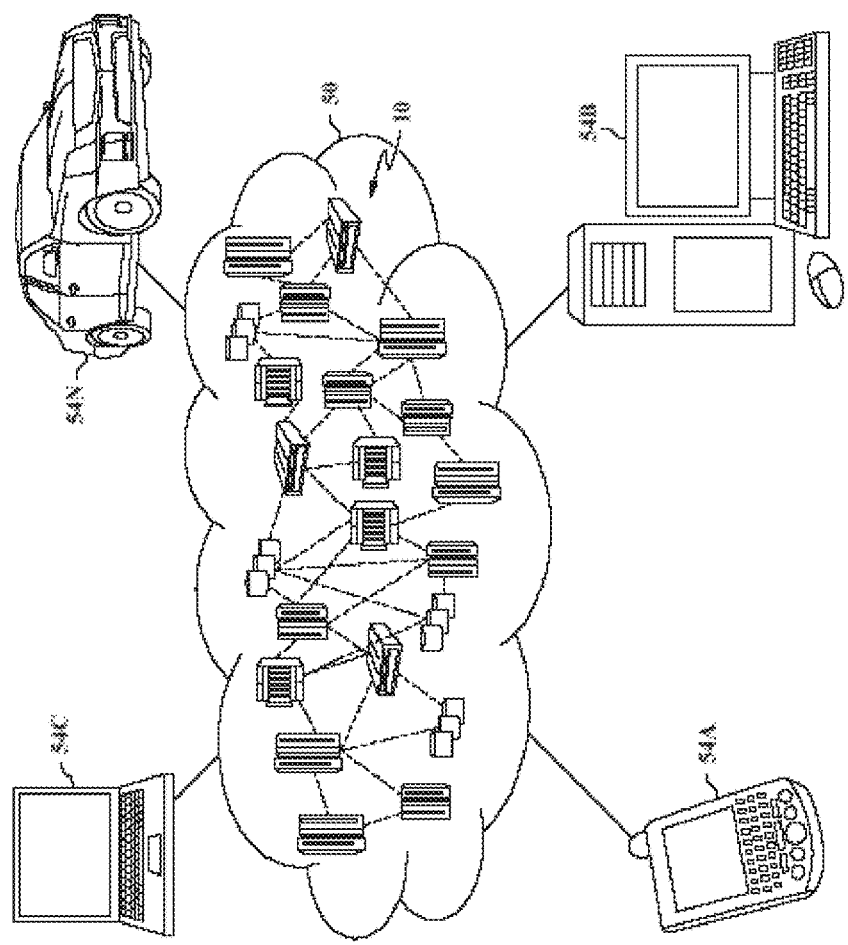
FIG. 9 depicts a cloud computing environment, in accordance with embodiments of the present disclosure.

FIG. 8 depicts an exemplary embodiment of preparing computer nodes to boot over a multidimensional network fabric, in accordance with embodiments of the present disclosure.

As disclosed through the previous figures, a varying number of nodes 202, either as compute nodes and/or as storage nodes, can be connected to form the 3D torus fabric 200 of FIG. 2. Each torus may be referred to as a network segment or quality of service zone (qzone). What is typically recognized as a cloud infrastructure may be created or extended by connecting together several toruses. It should be emphasized that, although referred to as "a torus", the torus is not a physical or logical switch, but is the structure created by the connectivity of the nodes.

A fiber optics network of cables is physically connected together according to the configuration shown in the previous figures. Once the nodes are physically cabled, the rack-resident cable boxes in the qzone are cabled together. This completes the physical configuration of the torus. Although the nodes are physically connected and have power, there is no active network and no connectivity outside the torus. This is because the nodes have no disk storage, and therefore, no operating system images from which to boot. In this context, a node is considered outside the torus when it is not cabled into the physical configuration of the torus. However, such a node may still communicate with nodes inside the torus using traditional networking techniques, such as TC/IP over traditional Ethernet switches.

The following method is described with reference to a single node for clarity in presentation. However, all nodes that are connected to the torus fabric and that have power to their fabric processors execute the method.

Upon powering on, at 805, a node's fabric processor, such as FP 102A (FIG. 1), executes a series of program instructions that it retrieves from its internal non-volatile storage. The fabric processor retrieves the BMC's (i.e., BMC 102B of FIG. 1) MAC address from the BMC connected to the management port of the fabric processor. At this point, each BMC MAC address is unique, but each BMC has the same static IP address.

In the operation at 810, the fabric processor executes program instructions from its internal non-volatile storage to generate a plurality of DHCP discovery packets that have the BMC MAC address. The node is now connected to the torus fabric by way of the multi-host switch. The fabric processor begins broadcasting DHCP discovery packets out its PCIx connection to the multi-host switch. The multi-host switch broadcasts the DHCP discovery packets out all of its six ports into the torus. The broadcast is only to the adjacent nodes. Only those nodes with fabric processors that are initialized to the point of being able to receive the broadcast will respond. Even though the torus network is not initialized, the nodes are able to determine which nodes are adjacent because of the internal wiring of the rack-resident cable box, as described previously with reference to FIGS. 4A-5B. Although at their initialization the fabric processors are DHCP relay agents, they are not yet configured with meaningful IP addresses. The fabric processors in the remaining nodes continue to initialize, program their multi-host switches, and broadcast DHCP discovery packets to adjacent nodes, until all the fabric processors have discovered the configuration of the torus fabric. However, at this point the fabric processors have not yet contacted a DHCP server.

At 815, connectivity from the fabric processor of a primary exit node (PEN) inside the torus to a service provisioning node (SPN, not shown) outside the torus is established. The PEN is physically the bottom-most server in the first rack in the room.

The SPN accesses an inventory control system that includes records of all physical equipment in the torus, as well as records describing computing equipment in the non-torus based infrastructure (if any exist). A bridge component of the SPN translates the inventory records to a format compatible with the torus-based fabric. The translated inventory records can then be accessed through various application program interfaces (API) in the torus-based fabric. Since it has knowledge of both the torus-based and non-torus based infrastructure, the SPN may be used to migrate the resources in the non-torus based cloud infrastructure to that of the torus-based fabric, or to create a combined infrastructure consisting both non-torus based cloud infrastructure and torus-based fabric.

A customer area router (CAR) is physically located between the PEN and the SPN. Powering on the CAR establishes data link layer (i.e., of the OSI model) between the fabric processors in the torus fabric and the SPN outside of the torus, through the PEN.

Prior to step 820, when they initialized, the fabric processors of the torus nodes began broadcasting discovery packets within the torus. However, they were not answered, since no DHCP server was available. In the operation at 820, DHCP service is configured between the SPN and the torus by way of the fabric processor of the PEN.

The fabric processor of the PEN broadcasts DHCP discovery packets to adjacent nodes, in a similar manner to that of the other non-PEN fabric processors. In this case, since one of its six ports is connected to the CAR, the PEN (and any other exit node, such as edge nodes 202 of FIG. 2, so connected) receives a response from the DHCP service on the SPN. The DHCP response includes a location-based IP address and a hostname, as described next.

In addition to serving inventory information to the various APIs, the SPN is configured as a DHCP server. The bridge component of the SPN can compute location-based IP addresses from the inventory records. The inventory records include the BMC MAC address that was scanned from a bar code on the physical server, and other data that can pinpoint the physical location of a server, such as the data center identifier, fault zone (i.e., servers groups according to availability requirements), qzone, room, rack, and position within the rack. In some embodiments, the location-based IP address is computed when the node is added to the inventory. Similarly, if the node is physically moved to another location, the location-based IP address is re-computed to reflect the new location.

The DHCP service on the SPN is aware of the BMC MAC addresses. Therefore, when the DHCP service receives a request from a torus node, it responds with a location-based IP address that corresponds to the physical location of the requestor's BMC MAC address.

A location-based IP address has the form of xx.yy. (9 bits rack identifier and 7 bits server identifier). With a location-based IP address, nine bits can identify up to five hundred twelve racks. Seven bits can identify up to sixty four servers within the rack. The least significant bit being a zero indicates the IP address is associated with a fabric processor, whereas a least significant bit being a one indicates the IP address is associated with a host. The xx bits are typically set to decimal "10". The yy bits uniquely identify the fault zone (fzone), qzone, and room. In some embodiments, the location-based IP addresses can identify at least a data center, a room within the data center, a rack, a server, and a torus fabric qzone.

For example, the IPv4 location-based IP address for the host processor is 10.69.4.3. It is derived from: fzone='01'b, qzone='0001'b, room='01'b, rack id='000001000'b, and server='000001'b. The location-based IP address for the node's fabric processor is 10.69.4.2. The relationship of the fabric processor IP address to that of the host is described more fully with respect to FIG. 8.

At 825, the fabric processor on the PEN receives its location-based IP address and a hostname from the DHCP response. The fabric processor then executes a series of program instructions to mask off all but the low-order eighteen bits to discover its physical room, rack, and server location. The PEN is the first server in the first rack in the first room. Therefore, if the masked value indicates that its location is Room, '01'b, Rack, '000000001'b, Server, '000001'b, then the fabric processor discovers that it is the PEN.

In the operation at 830, now that it has a valid IP address, the fabric processor on the PEN configures its DHCP relay to point to the actual SPN IP address from which it received its IP address. The fabric processor on the PEN notifies its adjacent nodes of the IP address of the DHCP service. These adjacent nodes can properly configure their DHCP relay to point to the DHCP service on the SPN. This propagates throughout the fabric until every fabric processor is configured with the rules for sending its DHCP discovery packet via DHCP relays through the fabric to the exit nodes where they are forwarded to the DHCP service on the SPN. The SPN provides the DHCP response for each unique fabric processor BMC MAC address that it sees. This response is the location-based fabric processor IP address.

The operations 805-830 described the actions by which each node's fabric processor discovered its location-based IP address, and configured DHCP accessibility to the DHCP service on the SPN. However, the fabric processor is a special purpose processor for managing the torus fabric, and is not one of the general-purpose processors (such as host processor CPU 102C of FIG. 1) allocated, for example, for customer workloads.

Now, in step 835 each fabric processor computes a host MAC address which will be used by the DHCP service to boot the node and install an operating system image.

The fabric processor calculates a host MAC address. The SPN and the fabric processor each compute a host MAC address that is the same for both. Therefore, in the exemplary embodiment, the SPN and fabric processor agree to fix the upper three bytes as 0x08 0x00 0x5a. The fabric processor computes the lower bytes by adding one to the low-order three bytes of the fabric processor IP address. The fabric processor then configures the first fabric interface with the calculated host MAC address. The first fabric interface is the one that will respond to the boot request during the installation of the operating system image. The fabric processor now programs the calculated host MAC address onto the first fabric interface of the multi-host switch EEPROM so that the effective host MAC address that shipped from the factory is now replaced by a location-based host MAC address that will be used for the rest of the life of the node (unless it is decommissioned or moved to another location in the fabric. To ensure the first fabric interface has the new host MAC address, the fabric processor unloads/reloads the multi-host switch driver.

At 840, the SPN performs a calculation similar to that in 835 to calculate host MAC addresses and host IP addresses that will be used for booting the nodes and installing the operating system images. The upper three bytes are fixed as 0x08 0x00 0x5a. The SPN knows the location-based IP addresses of the fabric processors, having previously calculated them from the inventory records. The SPN calculates the host IP address as the fabric processor IP address plus one. In addition, the SPN combines the upper three bytes that are fixed (0x08 0x00 0x5a) with the lower 3 bytes of the location based host IP address just computed to create the 48 bit location based host MAC address. Thus, both the SPN and the fabric processor can independently calculate the host network MAC address from the location information. This is essential so that the SPN based DHCP service will respond with the correct location based host IP address when the host for that particular node sends out its location based host MAC address.

Finally, at 845, the SPN updates its DHCP service with the new host MAC and IP addresses. As a result, the DHCP service is ready to receive boot and installation requests from the nodes. While the embodiments of the present disclosure prepare the nodes for boot and operating system image installation in the preboot execution environment (PXE), any installation process compatible with the torus fabric, fabric processors, multi-host switch and DHCP can be supported.

Initially, the SPN runs the DHCP service. This is because the SPN, through the bridge component, has direct access to the physical inventory records that are used to create the location-based IP addresses. Since the SPN is outside the torus, the DHCP service is also outside the torus. However, in other embodiments, a node within the torus can be configured to be the DHCP server.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method for preparing a plurality of computer nodes to boot in a multidimensional fabric network, comprising:
    retrieving, by a fabric processor (FP) of a computer node within the multidimensional fabric network, a MAC address from a baseboard management controller (BMC) of the computer node and configuring a DHCP discovery packet using the BMC MAC address and sending that packet into the multi-host switch, wherein the BMC is directly connected to the FP by a management port, and wherein the BMC, the multi-host switch, and the FP are located inside the computer node;
    establishing an exit node from the multidimensional fabric network to a service provisioning node (SPN) outside the multidimensional fabric network, wherein the SPN is not part of the multidimensional fabric network;
    forwarding, by the exit node to the SPN, DHCP requests for IP addresses from the multi-host switch of the computer node within the multidimensional fabric network, wherein the computer node is identified by the BMC MAC address found in the DHCP discovery packet coming from that node's multi-host switch;

receiving, from the SPN by the exit node, a location-based IP address, and forwarding the received location-based IP address to the computer node, wherein the location-based IP address is a computed IP address that uniquely identifies the physical location of the computer node within the multidimensional fabric network;

calculating, by the FP, a host MAC address, wherein the host MAC address is the FP received location-based IP address plus a value of one, combined with a fixed, three byte value for a high twenty-four bits of a forty-eight bit MAC address, the fixed three byte value being known by all nodes and by the SPN; and programming, by the FP, the calculated host MAC address onto the multi-host switch, wherein the calculated host MAC address replaces the factory default MAC address in NVRAM.

2. The method of claim 1, wherein the multidimensional fabric network is a 2D or higher torus topology, and wherein the computer nodes are arranged in either a balanced or an unbalanced directionality.

3. The method of claim 1, wherein management traffic and data traffic both flow over a same physical network in the multidimensional fabric network, and wherein the FP at a destination node separates out and sends the management traffic to the BMC of a destination computer node.

4. The method of claim 1, wherein upon being configured with the BMC MAC address the FP broadcasts DHCP discovery packets out all ports of the multi-host switch to adjacent computer nodes using the BMC MAC address, wherein the broadcasting establishes the directionality of the multidimensional fabric network.

5. The method of claim 1, wherein establishing the exit node further comprises:

receiving, by the SPN, DHCP discovery packets from the computer node within the multidimensional fabric network;

matching, by the SPN, a MAC address in the received DHCP discovery packets to MAC addresses in inventory records that uniquely identify physical equipment in the multidimensional fabric network;

computing a location-based IP address, based on a physical location of the MAC address matching that of the requesting computer node; and designating, by the FP, the requesting computer node as the exit node, based on the received location-based IP address identifying the requesting computer node as a first server in a first rack in a first room.

6. The method of claim 1, wherein the SPN calculates the location-based IP address for the FP based on the physical location of the computer node, and wherein the location-based IP address is a combination of bit settings representing a fault zone, a quality of service zone, a room, a rack within the room, and a server within the rack.

7. A computer program product for preparing a plurality of computer nodes to boot in a multidimensional fabric network, comprising:

program instructions to retrieve, by a fabric processor (FP) of a computer node within the multidimensional fabric network, a MAC address from a baseboard management controller (BMC) of the computer node and configuring the BMC MAC address into a DHCP discovery packet which the FP broadcasts out all ports of a multi-host switch, wherein the BMC is directly connected to the FP by a management port, and wherein the BMC, the multi-host switch, and the FP are located inside the computer node;

program instructions to establish an exit node from the multidimensional fabric network to a service provisioning node (SPN) outside the multidimensional fabric network, wherein the SPN is not part of the multidimensional fabric network;

program instructions to forward, by the exit node to the SPN, DHCP requests for IP addresses from the multi-host switch of the computer node within the multidimensional fabric network, wherein the computer node is identified by the BMC MAC address found in the DHCP discovery packet coming from that node's multi-host switch;

program instructions to receive, from the SPN by the exit node, a location-based IP address, and forwarding the received location-based IP address to the computer node, wherein the location-based IP address is a computed IP address that uniquely identifies the physical location of the computer node within the multidimensional fabric network;

program instructions to calculate, by the FP, a host MAC address, wherein the host MAC address is the FP received location-based IP address plus a value of one combined with a known, fixed value for an upper three bytes of a forty-eight bit host MAC address; and program instructions to program, by the FP, the calculated host MAC address onto the multi-host switch, wherein the calculated host MAC address replaces the factory host MAC address in NVRAM.

8. The computer program product of claim 7, wherein the multidimensional fabric network is a 2D or higher torus topology, and wherein the computer nodes are arranged in either a balanced or an unbalanced directionality.

9. The computer program product of claim 7, wherein management traffic and data traffic both flow over a same physical network in the multidimensional fabric network, and wherein the FP at a destination node separates out and sends the management traffic to the BMC of a destination computer node.

10. The computer program product of claim 7, wherein upon being configured with the BMC MAC address, the FP broadcasts DHCP discovery packets out all ports of the multi-host switch to adjacent computer nodes using the BMC MAC address, wherein the broadcasting establishes the directionality of the multidimensional fabric network.

11. The computer program product of claim 7, wherein establishing the exit node further comprises:

program instructions to receive, by the SPN, DHCP discovery packets from the computer node within the multidimensional fabric network;

program instructions to match, by the SPN, a MAC address in the received DHCP discovery packets to MAC addresses in inventory records that uniquely identify physical equipment in the multidimensional fabric network;

program instructions to compute a location-based IP address, based on a physical location of the MAC address matching that of the requesting computer node; and program instructions to designate, by the FP, the requesting computer node as the exit node, based on the received location-based IP address identifying the requesting computer node as a first server in a first rack in a first room.

12. The computer program product of claim 7, wherein the SPN calculates the location-based IP address for the FP based on the physical location of the computer node, and wherein the location-based IP address is a combination of bit settings representing a fault zone, a quality of service zone, a room, a rack within the room, and a server within the rack.

13. The computer program product of claim 7, wherein the exit node is configured as a DHCP relay between the computer nodes in the multidimensional fabric network and the SPN.

14. A computer system for preparing a plurality of computer nodes to boot in a multidimensional fabric network, comprising:
one or more processors, one or more tangible computer-readable storage devices, and a plurality of program instructions stored on at least one of the one or more tangible computer-readable storage devices for execution by at least one of the one or more processors, the plurality of program instructions comprising:
retrieving, by a fabric processor (FP) of a computer node within the multidimensional fabric network, a MAC address from a baseboard management controller (BMC) of the computer node and configuring a DHCP discovery packet using the BMC MAC address and sending that packet into the multi-host switch, wherein the BMC is directly connected to the FP by a management port, and wherein the BMC, the multi-host switch, and the FP are located inside the computer node;
establishing an exit node from the multidimensional fabric network to a service provisioning node (SPN) outside the multidimensional fabric network, wherein the SPN is not part of the multidimensional fabric network;
forwarding, by the exit node to the SPN, DHCP requests for IP addresses from the multi-host switch of the computer node within the multidimensional fabric network, wherein the computer node is identified by the BMC MAC address found in the DHCP discovery packet coming from that node's multi-host switch;
receiving, from the SPN by the exit node, a location-based IP address, and forwarding the received location-based IP address to the computer node, wherein the location-based IP address is a computed IP address that uniquely identifies the physical location of the computer node within the multidimensional fabric network;
calculating, by the FP, a host MAC address, wherein the host MAC address is the FP received location-based IP address plus a value of one, combined with a fixed, three byte value for a high twenty-four bits of a forty-eight bit MAC address, the fixed three byte value being known by all nodes and by the SPN; and
programming, by the FP, the calculated host MAC address onto the multi-host switch, wherein the calculated host MAC address replaces the factory default MAC address in NVRAM.

15. The computer system of claim 14, wherein the multidimensional fabric network is a 2D or higher torus topology, and wherein the computer nodes are arranged in either a balanced or an unbalanced directionality.

16. The computer system of claim 14, wherein management traffic and data traffic both flow over a same physical network in the multidimensional fabric network, and wherein the FP at a destination node separates out and sends the management traffic to the BMC of a destination computer node.

17. The computer system of claim 14, wherein the FP broadcasts DHCP discovery packets out all ports of the multi-host switch to adjacent computer nodes using the BMC MAC address, wherein the broadcasting establishes the directionality of the multidimensional fabric network.

18. The computer system of claim 14, wherein establishing the exit node further comprises:
receiving, by the SPN, DHCP discovery packets from the computer node within the multidimensional fabric network;
matching, by the SPN, a MAC address in the received DHCP discovery packets to MAC addresses in inventory records that uniquely identify physical equipment in the multidimensional fabric network;
computing a location-based IP address, based on a physical location of the MAC address matching that of the requesting computer node; and
designating, by the FP, the requesting computer node as the exit node, based on the received location-based IP address identifying the requesting computer node as a first server in a first rack in a first room.

19. The computer system of claim 14, wherein the SPN calculates the location-based IP address for the FP based on the physical location of the computer node, and wherein the location-based IP address is a combination of bit settings representing a fault zone, a quality of service zone, a room, a rack within the room, and a server within the rack.

20. The computer system of claim 14, wherein the exit node is configured as a DHCP relay between the computer nodes in the multidimensional fabric network and the SPN.

* * * * *